(12) United States Patent
Mizusawa

(10) Patent No.: US 8,836,985 B2
(45) Date of Patent: *Sep. 16, 2014

(54) PROCESS EXECUTING METHOD, PROGRAM THEREOF, AND PRINT INSTRUCTING DEVICE

(71) Applicant: Seiko Epson Corporation, Tokyo (JP)

(72) Inventor: Nobutada Mizusawa, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/906,283

(22) Filed: May 30, 2013

(65) Prior Publication Data

US 2013/0271787 A1 Oct. 17, 2013

Related U.S. Application Data

(63) Continuation of application No. 12/700,646, filed on Feb. 4, 2010, now Pat. No. 8,472,055.

(30) Foreign Application Priority Data

Feb. 6, 2009 (JP) ................................. 2009-026557

(51) Int. Cl.
 *G06F 3/12* (2006.01)
 *G06K 15/00* (2006.01)
(52) U.S. Cl.
 CPC ............ *G06K 15/401* (2013.01); *G06F 3/1253* (2013.01); *G06F 3/1205* (2013.01)
 USPC ....... 358/1.15; 358/1.12; 358/1.16; 358/1.17; 358/1.18; 358/1.2

(58) Field of Classification Search
None
See application file for complete search history.

(56) References Cited

U.S. PATENT DOCUMENTS

| 6,847,466 | B1 | 1/2005 | Gazdik et al. |
| 7,325,235 | B2 * | 1/2008 | Iida et al. ....................... 719/310 |
| 2008/0180741 | A1 * | 7/2008 | Miyata .......................... 358/1.15 |

FOREIGN PATENT DOCUMENTS

| JP | 2001-043051 A | 2/2001 |
| JP | 2001-350610 A | 12/2001 |
| JP | 2004-126940 A | 4/2004 |
| JP | 2004-287642 A | 10/2004 |
| JP | 2006-178623 A | 7/2006 |
| JP | 2009-003712 A | 1/2009 |

* cited by examiner

*Primary Examiner* — Satwant Singh
(74) *Attorney, Agent, or Firm* — Kilpatrick Townsend & Stockton LLP

(57) ABSTRACT

Provided is a method of executing a process by a driver using a storing unit having a first region capable of storing data and a second region capable of storing data with lower generality than the first region. The method includes storing a print-related value that relates to printing in the second region when an excess instruction that instructs the print-related value to be a value that exceeds a predetermined value is given. When the print-related value is not stored in the second region, a print instruction is given to a printing apparatus using print setting information including a print-related value stored in the first region at non-storing time. The method further includes giving a print instruction to the printing apparatus by using print setting information including a print-related value stored in the second region at storing time when the print-related value is stored in the second region.

5 Claims, 5 Drawing Sheets

PROCESS EXECUTING METHOD, PROGRAM THEREOF, AND PRINT INSTRUCTING DEVICE

This application is a continuation of U.S. patent application Ser. No. 12/700,646, filed Feb. 4, 2010, which claims the priority to Japanese Patent Application No. 2009-026557, filed Feb. 6, 2009, the entire disclosures of which are incorporated by reference herein.

BACKGROUND

1. Technical Field

The present invention relates to a process executing method, a program thereof, and a print instructing device.

2. Related Art

In related art, a kind of process executing method was suggested that a printer driver in a computer refers to an optimization table of print setting information (DEVMODE) according to identification information (ID) of a print object corresponding to an object designated by an application to inform the application of the DEVMODE corresponding to the ID (for example, JP-A-2001-350610). In that method, the printer driver refers to the DEVMODE optimization table and constructs the DEVMODE to inform the application of the construction and the application informs a user of the DEVMODE. Accordingly, it is possible to inform a user that the user is allowed to select whether the DEVMODE is to be used or not.

In the industry of business printing, there are cases of demanding to print a same image (for example, a label, a stamp, or the like) on a material such as a roll sheet in a large volume. In the above-described process executing method, a specific data size (for example, short type (signed 16 bit) and the like) is often used for data on the number of prints that are exchanged between an application and a printer driver via an operating system. For this reason, the number of prints that exceeds the data size cannot be designated by the application, and printing of the number of prints that exceeds the range cannot be designated in the printer at once. Furthermore, in addition to that, sometimes there are demands for printing on a sheet with a size that exceeds a predetermined range or printing with a number of pixels that exceeds a predetermined range. However, printing can be instructed to a printer only when its size of data is within the range corresponding to size of data that can be exchanged between an application and a printer driver.

SUMMARY

An advantage of some aspects of the invention is that a process executing method, a program thereof, and a print instructing device of the invention enables a print instruction to be given to a printing apparatus by using print-related information including a print-related value which is a value relating to printing that exceeds a predetermined value.

The process executing method, the program thereof, and the print instructing device of the invention employed the following elements in order to achieve the main object described above.

According to a first aspect of the invention, there is provided a method of executing a process by a driver by using a storing unit that has a first region capable of storing data and a second region capable of storing data with lower generality than the first region. The method includes (a) storing a print-related value that is a value relating to printing in the second region when an excess instruction that instructs the print-related value to be a value that exceeds a predetermined value is given, and (b) giving a print instruction to a printing apparatus by using print setting information including a print-related value stored in the first region at non-storing time when the print-related value is not stored in the second region and giving a print instruction to the printing apparatus by using print setting information including a print-related value stored in the second region at storing time when the print-related value is stored in the second region, in the case of giving a print instruction to the printing apparatus.

In the method of executing a process according to the above aspect, when the excess instruction that instructs a print-related value which is a value relating to printing to be a value that exceeds a predetermined value, the print-related value is stored in the second region capable of storing data with lower generality than the first region. Then, in the case where a print instruction is given to the printing apparatus, at the non-storing time when the print-related value is not stored in the second region, the print instruction is given to the printing apparatus by using print setting information including the print-related value stored in the first region. At the storing time when the print-related value is stored in the second region, the print instruction is given to the printing apparatus by using print setting information including the print-related value stored in the second region. In other words, at the storing time when the print instruction is given to the printing apparatus, the print instruction is given to the printing apparatus by using the print setting information including the print-related value stored in the second region that has lower generality than the first region. Accordingly, it is possible to give the print instruction to the printing apparatus by using print-related information including a print-related value that exceeds a predetermined value. Here, the "first region" refers to a region that is defined by an operating system and recognizable by the operating system, an application, and a driver, and the "second region" refers to a region that is defined by a driver and recognizable only by the driver. In addition, the "predetermined value" refers to a value corresponding to the size of data that is exchanged between the application and the driver when the process executing method of the invention is a method in which an instruction is received from the application to cause the driver to execute a process. Furthermore, in the step (a) above, the print-related value may be stored in the first region when the excess instruction is not given.

According to the above aspect of the invention, there is provided the method of executing a process where the step (a) is storing excess instruction information on whether the excess instruction is given or not in the second region, and the step (b) is determining whether it is the non-storing time or the storing time based on the stored excess instruction information and giving a print instruction to the printing apparatus based on the result of the determination. Accordingly, it is possible to perform the print instruction to the printing apparatus according to the excess instruction information.

In the method of executing a process according to the above aspect, in the case where the excess instruction is given, the step (a) may be storing the print-related value stored in the first region when the excess instruction is not given in the second region. Thus, in the case where the excess instruction is given, the print-related value stored in the first region with relatively high generality when the excess instruction is not given may be stored in the second region with lower generality than the first region. Accordingly, it is possible to give the print instruction to the printing apparatus by using the print-related information including the print-related value that exceeds the predetermined value.

According to the above aspect of the invention, there is provided the method of executing a process where the print-related value is a value including at least one of the number of prints, sheet size, and the number of pixels. Thus, it is possible to instruct a printing apparatus to perform printing with a large-volume, a large sheet size, and a large number of pixels (such as resolution). Here, the "sheet size" refers to the length of the roll sheet in the longitudinal direction (the winding direction) when it is used as a print medium onto which a printing apparatus performs printing.

According to the above aspect of the invention, there is provided the method of executing a process where the predetermined value is an upper limit of the print-related value that a user is allowed to input when the excess instruction is not given. When (c) the excess instruction is given before the step (a), it is possible to inform a user that the user is allowed to input the print-related value that is equal to or less than a second predetermined value higher than the predetermined value. Thus, it is possible to inform the user that it is the state corresponding to the excess instruction. Here, the user may be informed by enlarging the region in which the print-related value is input or by displaying the upper limit of the print-related value allowable to be input.

According to a second aspect of the invention, there is provided a program for causing a computer to execute the respective steps of the process executing method. The program may be recorded on a recording medium (for example, a hard disk, a ROM, an FD, a CD, a DVD, and the like) readable by a computer, may be delivered to a separate computer from a computer connected via a transmission medium (a communication network such as the Internet, a LAN, or the like), or may be transferred or received in any other format. Causing a computer to execute the program or causing a plurality of computers to execute the program by dividing the process into respective steps can perform each step of the process executing method of the invention according to any aspect described above. Therefore, the same action and effect as the process executing method of the invention can be obtained.

According to a third aspect of the invention, there is provided a print instructing device for giving a print instruction to a printing apparatus. The device includes a storing unit having a first region capable of storing data and a second region capable of storing data with lower generality than the first region, a storage controlling unit causing a print-related value, which is a value relating to printing, to be stored in the second region when an excess instruction that instructs the print-related value to be a value that exceeds a predetermined value is given, and a print instructing unit giving a print instruction to a printing apparatus by using print setting information including a print-related value stored in the first region at non-storing time when the print-related value is not stored in the second region, and giving a print instruction to the printing apparatus by using print setting information including a print-related value stored in the second region at storing time when the print-related value is stored in the second region, in the case of giving a print instruction to the printing apparatus.

In the print instructing device according to the above aspect, when the excess instruction that instructs the print-related value which is a value relating to printing to be the value that exceeds the predetermined value is given, the print-related value is stored in the second region. Then, in the case where the print instruction is given to the printing apparatus, at the non-storing time when the print-related value is not stored in the second region, the print instruction is given to the printing apparatus by using the print setting information including the print-related value stored in the first region. At the storing time when the print-related value is stored in the second region, the print instruction is given to the printing apparatus by using the print setting information including the print-related value stored in the second region. In other words, when the print instruction is given to the printing apparatus at the storing time, the print instruction to the printing apparatus is given by using the print setting information including the print-related value stored in the second region with lower generality than the first region. Accordingly, it is possible to give the print instruction to the printing apparatus by using the print setting information including the print-related value that exceeds the predetermined value.

DESCRIPTION OF EXEMPLARY EMBODIMENTS

Figure 1:
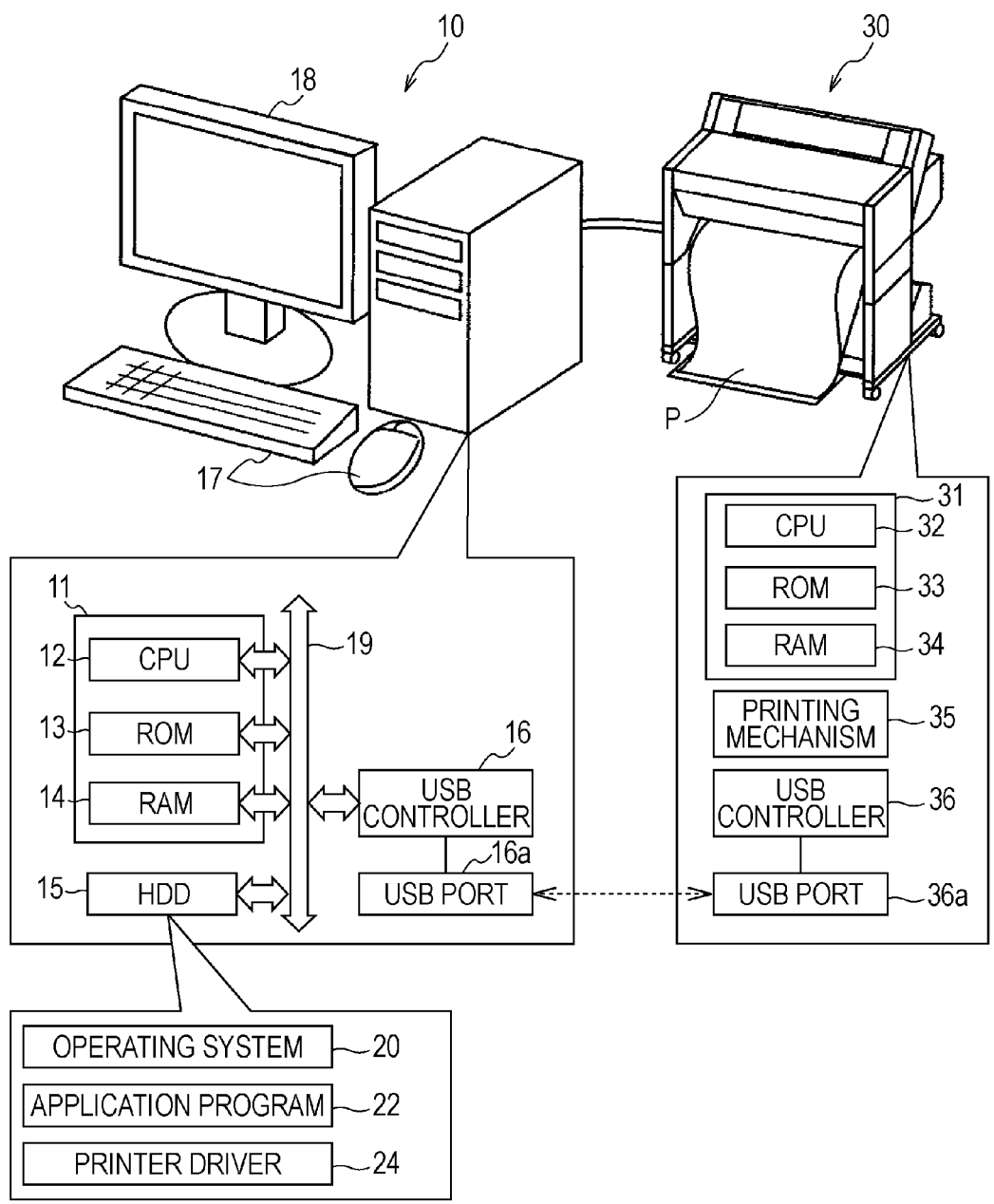
FIG. 1 is a structural diagram schematically illustrating the configuration of a user PC and a printer.

Hereinafter, an exemplary embodiment of the process executing method according to the invention will be explained in detail with reference to accompanying drawings. FIG. 1 is a structural diagram schematically illustrating the configuration of a user personal computer (PC) 10 as a print instructing device and a printer 30 as a printing apparatus according to an embodiment of the invention. The user PC 10 is a well-known general computer configured as a print instructing device for a computer user. The user PC 10 includes a controller 11 constituted by a CPU 12 that executes various controls, a ROM 13 that stores various processing programs, and a RAM 14 that temporarily stores data, HDD 15 which is a large-capacity memory for storing various application programs and data files, and a USB controller 16 that performs input and output of data between external devices connected to a USB port 16a. The HDD 15 stores an operating system 20, an application program 22 that has functions of creating, editing, and instructing printing a document or an image, and a printer driver 24 that is used for processing printing by transmitting a print job to the printer 30. The user PC 10 includes an input device 17 such as a keyboard or a mouse that enables a user to input various commands, and a display 18 that displays various information on the screen, and has a function of executing processes in response to input operations when a user inputs a cursor or the like displayed on the display 18 with the input device 17. The controller 11, the HDD 15, the USB controller 16, the input device 17 and the display 18 are electrically connected to one another via a bus 19, and configured to enable exchange of various control signals or data. The user PC 10 transmits a print instruction to the printer 30 and displays the information of the printer 30.

The printer 30 is a printer for a large-scale printing of a document or an image onto a roll sheet P mounted on a mounting part, and includes a controller 31 having a ROM 33 that stores various processing programs and a RAM 34 that temporarily stores data and in charge of controlling the entire apparatus as a microprocessor constituted mainly by a CPU 32, a printing mechanism 35 for processing printing of an image onto the roll sheet P, and a USB controller 36 capable of inputting and outputting information between external devices connected to a USB port 36a. The controller 31, the printing mechanism 35, and the USB controller 36 are electrically connected to one another via a bus (not shown in the drawing). The printing mechanism 35, not shown in FIG. 1, is an ink jet type mechanism that puts pressure on various colors of ink, and executes a printing process by discharging the pressurized ink onto the roll sheet P. The mechanism of putting pressure on ink may arise from the deformation of a piezoelectric element or the generation of bubbles due to the heat of a heater.

Next, the operation of the user PC 10 according to the embodiment configured as above, particularly the operation when a print instruction is given to the printer 30 will be described. First of all, the operation when a user selects printing of a document or an image during the execution of the application program 22 will be explained, and then the operation when a print instruction is given to the printer 30 will be explained, for the sake of convenient explanation.

Figure 2:
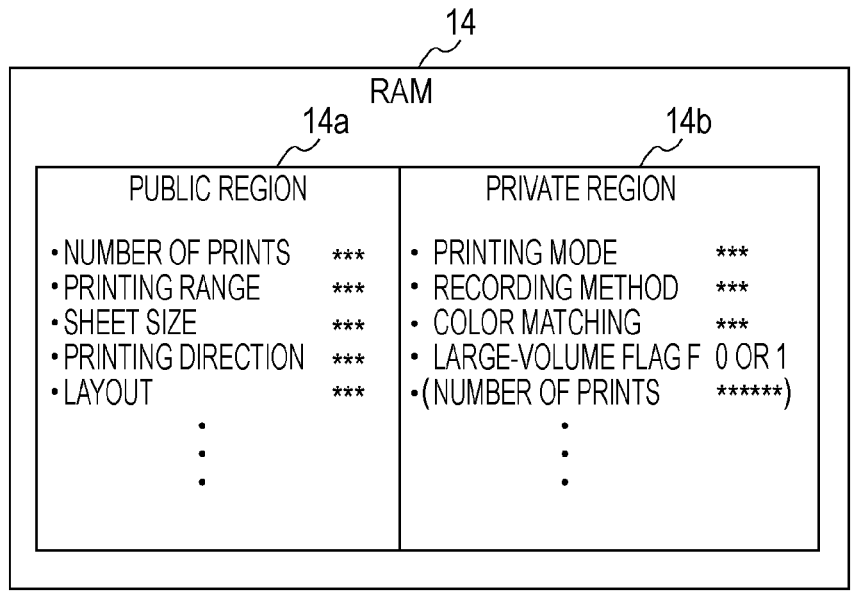
FIG. 2 is a diagram illustrating an example of a RAM.

When a user selects printing of a document or an image during the execution of the application program 22, the CPU 12 of the controller 11 first writes initial values (default values) of print setting (hereinafter, referred to as Devmode) of the printer 30 stored in the HDD 15 on a Public region 14a or a Private region 14b secured in the RAM 14 as a region for storing the Devmode as shown in FIG. 2. Here, the Public region 14a is defined by the operating system 20 and recognizable by the operating system 20, the application program 22, and the printer driver 24 (a region with relatively high generality). The Private region 14b is defined by the printer driver 24 and recognizable only by the printer driver 24 (a region with lower generality than the Public region 14a). In this embodiment, the Public region 14a is written with data such as the number of prints, a sheet size, the direction of printing, and the layout of a page in the Devmode. The Private region 14b is written with data such as a printing mode, a recording method, and color matching in the Devmode. In addition, in the present embodiment, a specific data size (for example, short type (signed 16 bit)) may be used for respective data of the Devmode exchanged between the application program 22 and the printer driver 24 via the operating system 20. For this reason, the number of prints written in the Public region 14a is a value equal to or less than the upper limit of the number of prints (for example, a number with 3 or 4 digits, hereinafter referred to as a first upper limit of the number of prints Nmax 1) set in advance within the range of the specific data size (1 to 32767 in the case of the short type). In FIG. 2, the Private region 14b is written with a large-volume flag F indicating whether printing in a large volume is set or not, and the number of prints when predetermined conditions are satisfied, which will be described later.

Figure 3:
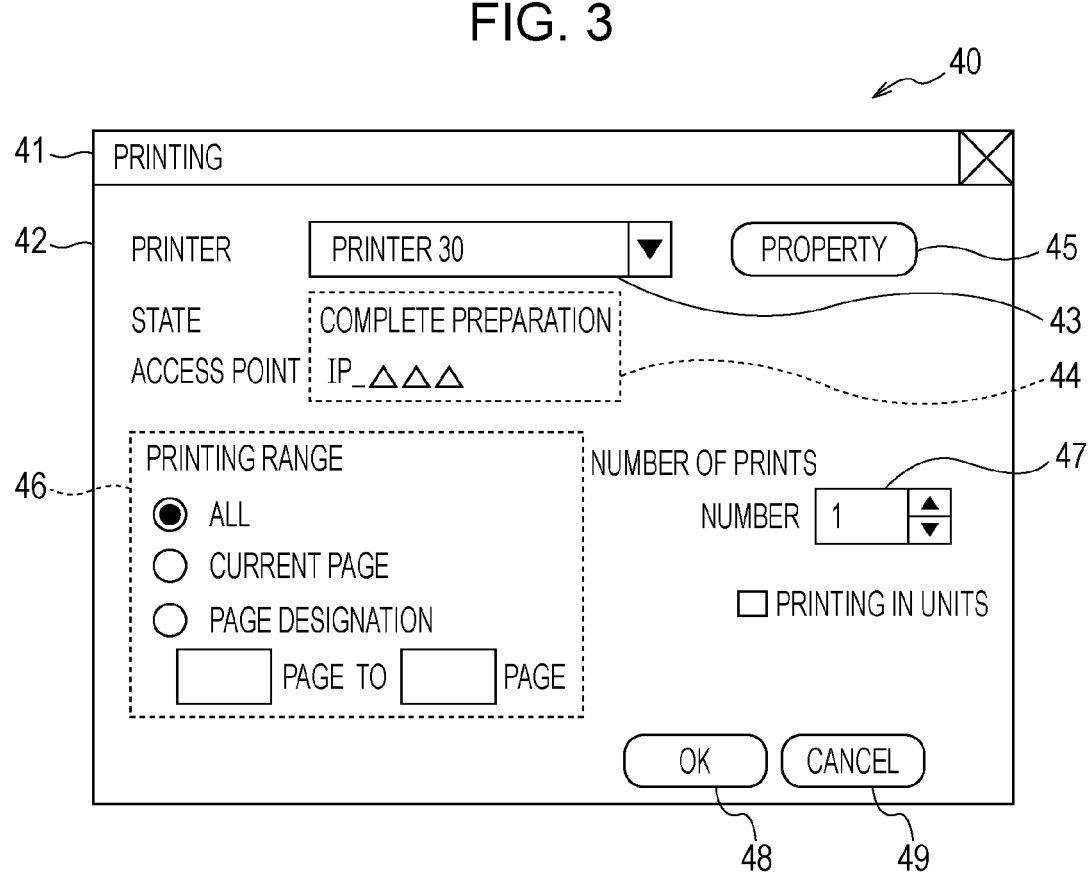
FIG. 3 is a diagram illustrating an example of a print setting screen.

When the default values of the Devmode are written in the Public region 14a or the Private region 14b in the RAM 14 as above, the CPU 12 carries out a process of requesting the Devmode from the printer driver 24 as a process by the application program 22, then a process of reading the Devmode stored in the RAM 14 to output to the application program 22 as a process by the printer driver 24, and a process of displaying a print setting screen 40 on the display 18 by using the Devmode from the printer driver 24 as a process by the application program 22. An example of the print setting screen 40 is shown in FIG. 3. As shown in the drawing, the print setting screen 40 is constituted by a title bar 41 that is provided in the upper portion of the print setting screen 40 in a strip shape to display a Windows title ("print" in this embodiment), and a main screen 42 that is provided below the title bar 41. The main screen 42 includes a printer name displaying portion 43 for displaying the name of the printer 30, a printer information displaying portion 44 for displaying information of the printer 30 provided by the printer driver 24, a property button 45 for displaying a property screen 50 which will be described later, a print range setting portion 46 for setting the range of printing, a number of prints setting portion 47 for setting the number of prints, an OK button 48, and a cancel button 49. Here, the number of prints setting portion 47 is configured to be input with a value equal to or less than the first upper limit of the number of prints by a user as described above. Moreover, in the present embodiment, a value that a user can change on the print setting screen 40 is deemed as a value (such as the number of prints) written in the Public region 14a. Furthermore, for the sake of convenient description in the following description, a user is assumed not to change the value (such as the number of prints) on the print setting screen 40.

Figure 4:
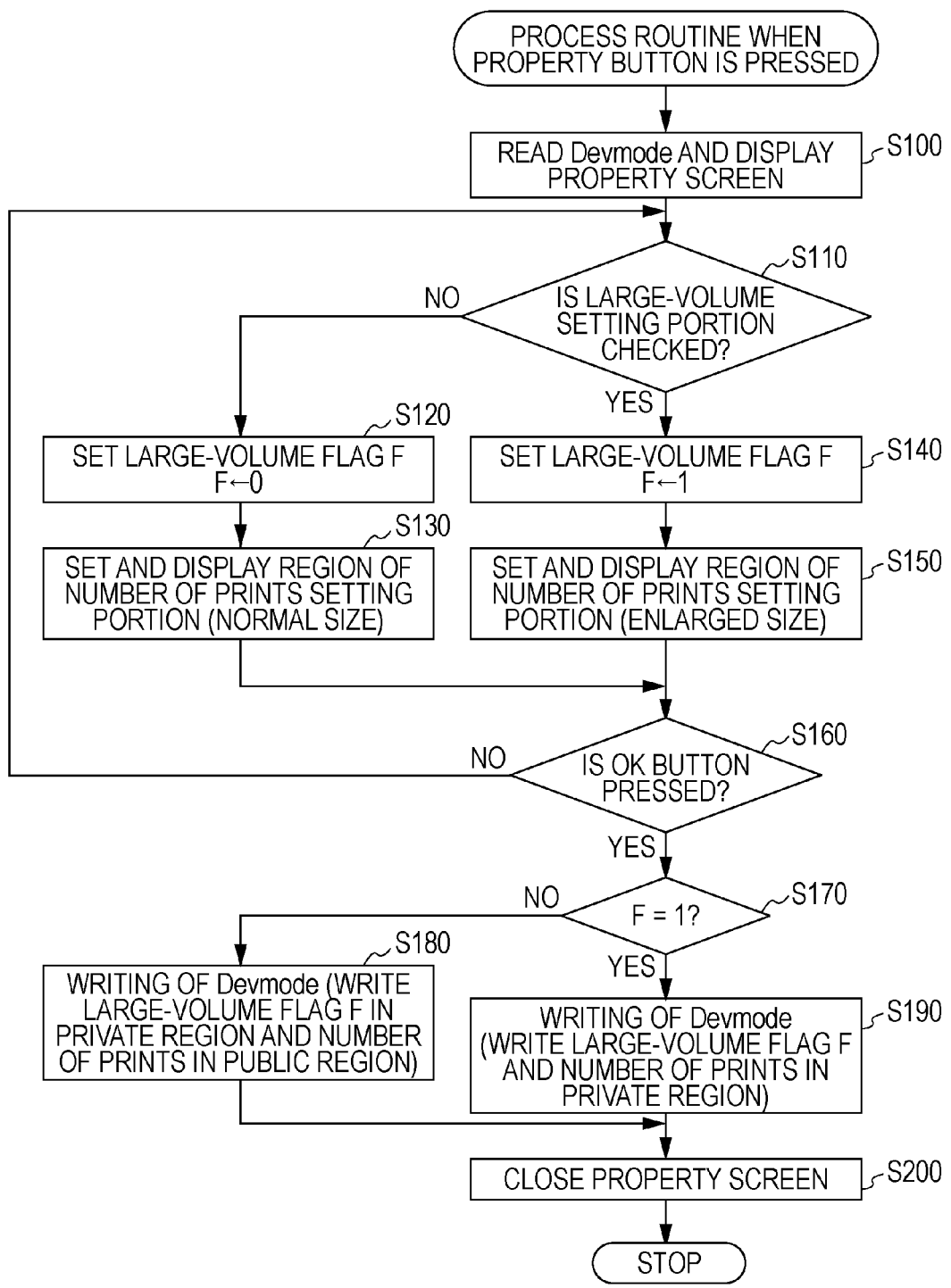
FIG. 4 is a flowchart illustrating an example of a process routine when a property button is pressed.
Figure 5:
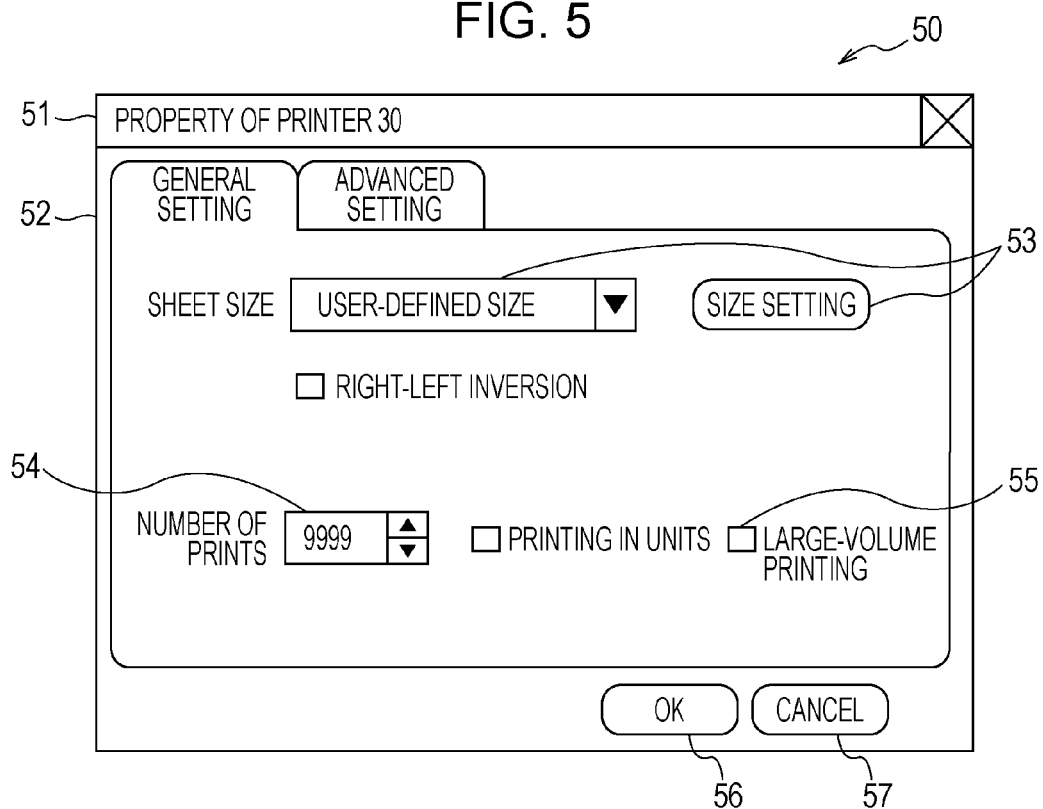
FIG. 5 is a diagram illustrating an example of a property screen.

When the property button 45 on the print setting screen 40 is pressed by a user while the print setting screen 40 is displayed on the display 18, the CPU 12 causes the printer driver 24 to execute a process, in particular, each process routine upon pressing the property button as shown in FIG. 4. When the process routine upon pressing the property button is executed, the CPU 12 first reads the Devmode written in the Public region 14a and the Private region 14b in the RAM 14, and displays the property screen 50 on the display 18 by using the read Devmode (Step S100). An example of the property screen 50 is shown in FIG. 5. The property screen 50 includes a title bar 51 that is provided in the upper portion of the property screen 50 in a strip shape and displays a Windows title ("Properties of the Printer 30" in this embodiment), and a main screen 52 provided below the title bar 51. The main screen 52 includes a sheet size setting portion 53 for setting the size of a sheet, a number of prints setting portion 54 for setting the number of prints, a large-volume setting portion 55 for setting whether to execute a large-volume printing, an OK button 56, and a cancel button 57. Here, the number of prints setting portion 54 is configured to be input with a value equal to or less than the first upper limit of the number of prints Nmax 1 by a user in the same manner as the number of prints setting portion 47 on the print setting screen 40 when the large-volume setting portion 55 is not checked. In FIG. 5, the value filled in the number of prints setting portion 54 is an example of the maximum number of prints (the first upper limit of the number of prints Nmax 1) that is possible to be input.

Subsequently, it is determined whether the large-volume setting portion 55 on the property screen 50 is checked (Step S110), and when it is determined that the large-volume setting portion 55 is not checked, the large-volume flag F which indicates whether large-volume printing is set or not is set to the value "0" (Step S120), and the size of the region of the number of prints setting portion 54 is displayed on the display 18 in a normal size (Step S130). Then, it is determined whether the OK button 56 on the property screen 50 is pressed by a user or not (Step S160), and when it is determined that the OK button 56 is not pressed, the process returns to Step S110. In other words, when the state where the large-volume setting portion 55 is not checked is maintained, the size of the region of the number of prints setting portion 54 is maintained to be a normal size. At this point, the user can input a value equal to or less than the first upper limit of the number of prints Nmax 1 into the number of prints setting portion 54.

Figure 6:
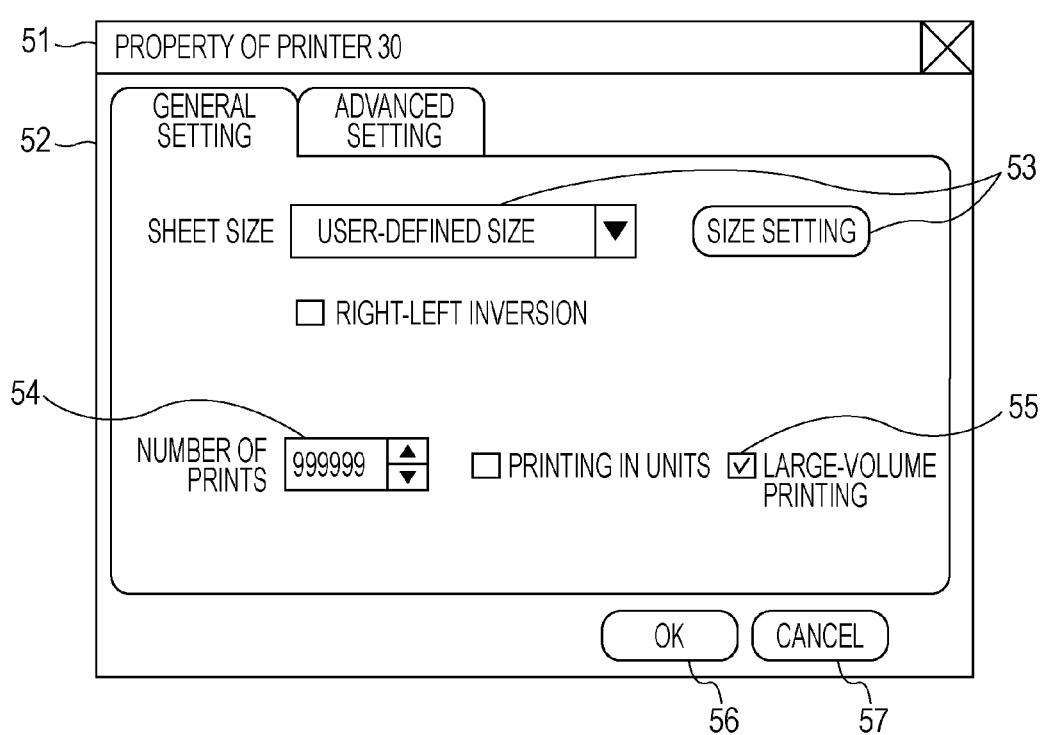
FIG. 6 is a diagram illustrating another example of the property screen.

On the other hand, when it is determined that the large-volume setting portion 55 is checked in Step S110, the large-volume flag F is set to the value "1" (Step S140), and the size of the region of the number of prints setting portion 54 is displayed on the display 18 in an enlarged size larger than the normal size (Step S150). Then, it is determined whether the OK button 56 on the property screen 50 is pressed by the user or not (Step S160), and when it is determined that the OK button 56 is not pressed, the process returns to Step S110. An example of the property screen 50 at that point is shown in FIG. 6. In FIG. 6, the number of prints setting portion 54 has an enlarged size of a value that is greater than the size of the data (for example, a short type) exchanged between the application program 22 and the printer driver 24 via the operating system 20 or than the first upper limit of the number of prints Nmax 1, and is equal to or less than the upper limit of the number of prints (for example, the number of prints with 6 or 7 digits, and hereinafter referred to as a second upper limit of the number of prints Nmax 2) set in advance within the range corresponding to the specifications of the printer driver 24 so that the user can input the size of the value. Moreover, the value filled in the number of prints setting portion 54 in the drawing is an example of the maximum number of prints (the second upper limit of the number of prints Nmax 2) that is possible to be input. In other words, in the process of Step S150, from when the large-volume setting portion 55 is not checked to when the portion is checked, the size of the region of the number of prints setting portion 54 is enlarged to be an enlarged size from the normal size. When the state where the large-volume setting portion 55 is checked is maintained, the size of the region of the number of prints setting portion 54 is maintained to be the enlarged size. As above, by enlarging the size of the region of the number of prints setting portion 54 when the large-volume setting portion 55 is checked bigger than the size when the portion 55 is not checked, it is possible to inform the user that the maximum number of prints that is possible to be input into the number of prints setting portion 54 became greater to be the second upper limit of the number of prints Nmax 2 from the first upper limit of the number of prints Nmax 1.

When it is determined that the OK button 56 is pressed in Step S160, the value of the large-volume flag F is examined (Step S170). When the large-volume flag F is the value "0", the number of prints, the sheet size, the direction of printing, the layout of a page and the like in the Devmode are written in the Public region 14a, and the large-volume flag F, the printing mode, the recording method, the color matching and the like in the Devmode are written in the Private region 14b (Step S180). Then the property screen 50 is closed (Step S200), and the routine ends. In addition, the number of prints written in the Public region 14a at that point is a value equal to or less than the first upper limit of the number of prints Nmax 1.

On the other hand, when the large-volume flag F is the value "1" in Step S170, the large-volume flag F and the number of prints in the Devmode are written in the Private region 14b, and data other than the number of prints in the Devmode are written in the Public region 14a and the Private region 14b in the same manner as when the large-volume flag F is the value "0" (Step S190). Then, the property screen 50 is closed (Step S200), and the routine ends. In other words, when the large-volume flag F is the value "1", the number of prints is written not in the Public region 14a but in the Private region 14b (see the Private region 14b in FIG. 2). The number of prints written in the Private region at that point is a value equal to or less than the second upper limit of the number of prints Nmax 2. Furthermore, when the property screen 50 is closed in the state where the large-volume setting portion 55 is checked, the CPU 12 causes the application program 22 to execute a process to display the large number of prints (for example, 999 or 9999) set in advance in the number of prints setting portion 47 on the print setting screen 40. Accordingly, the user can be informed that the large-volume setting portion 55 is checked.

Figure 7:
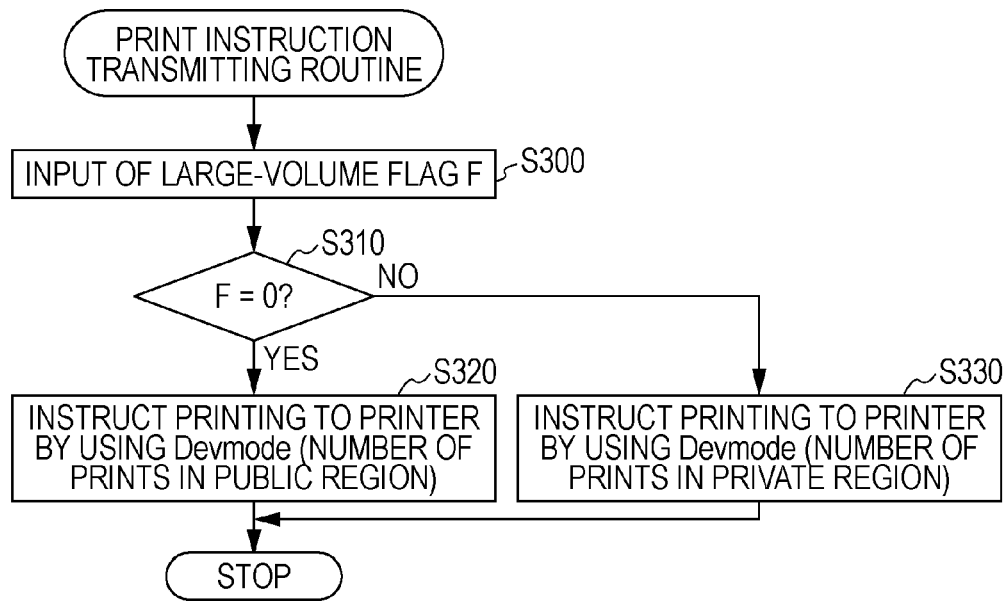
FIG. 7 is a flowchart illustrating an example of a print instruction transmitting routine.

Next, the operation of the user PC 10 when a print instruction is given to the printer 30 will be described. When a user presses the OK button 48 on the print setting screen 40 in FIG. 3, the CPU 12 causes the printer driver 24 to execute a process by using the Devmode, the print instruction, and the print data from the application program 22, in particular, each process of a print instruction transmitting routine as shown in FIG. 7. When the print instruction transmitting routine is executed, the CPU 12 inputs and examines a value of the large-volume flag F written in the Private region 14b (Steps S300 and S310). When the large-volume flag F is the value "0", it is determined that the large-volume setting portion 55 is not checked, and is assumed that the values (for example, the number of prints, and the like) on the print setting screen 40 is not changed. Accordingly, the Devmode (the number of prints is the value written in the Public region 14a), the print data (characters, images, or the like), and the print instruction written in the Public region 14a and the Private region 14b are transmitted to the printer 30 (Step S320), and the routine ends. The printer 30 that received the Devmode, the print data, and the print instruction carries out printing onto the roll sheet P. When the user changes the value (the number of prints, and the like) on the print setting screen 40 after closing the property screen 50, the value changed and output from the application program 22 is written in the Public region 14a and the written value is read to be transmitted to the printer 30, as a process of Step S320.

Figure 8:
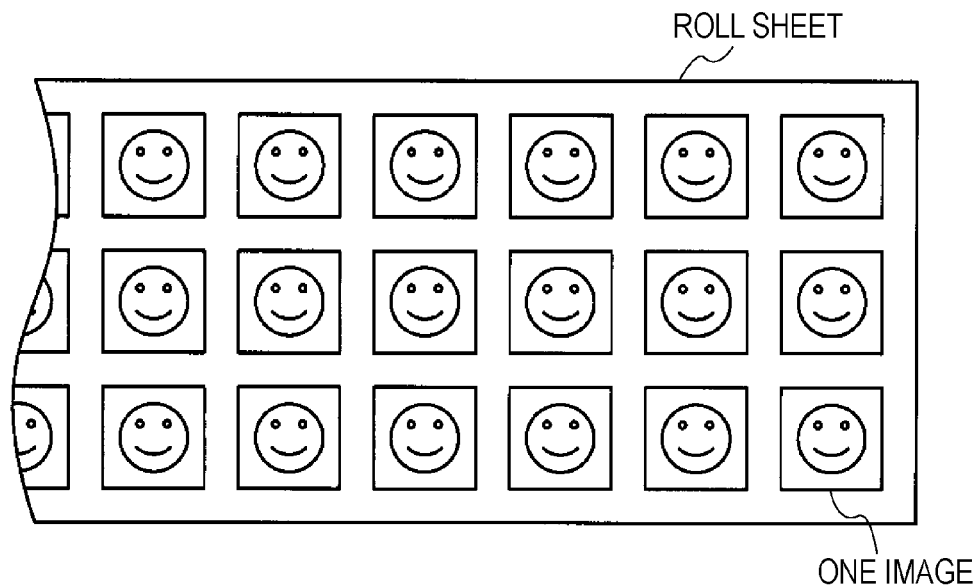
FIG. 8 is a diagram illustrating an example of large-volume printing.

On the other hand, when the large-volume flag F is the value "1" in Step S310, it is determined that the large-volume setting portion 55 is checked, and is assumed that the value (the number of prints, and the like) on the print setting screen 40 is not changed at that point. Accordingly, the Devmode (the number of prints is the value written in the Private region 14b), the print data, and the print instruction written in the Public region 14a and the Private region 14b are transmitted to the printer 30 (Step S330), and the routine ends. In other words, when the large-volume flag F is the value "1", the value in the Private region 14b (equal to or less than the second upper limit of the number of prints Nmax 2), not the value in the Public region 14a, is used for the number of prints in the Devmode. Furthermore, when the user changes the value on the print setting screen 40 after closing the property screen 50, the value changed and output from the application program 22 is written in the Public region 14a and the written value is read and transmitted to the printer 30 in the case where the value is not the number of prints, as a process of Step S330. On the other hand, in the case where the value changed and output from the application program 22 is the number of prints, the change is ignored, and the number of prints written in the Private region 14b is read to be transmitted to the printer 30. The printer 30 that received the Devmode, the print data and the print instruction carries out printing onto the roll sheet P. An example of large-volume printing by the printer 30 when the large-volume flag F is the value "1" is shown in FIG. 8. In the industry of business printing, there are cases of demanding to print a same image (for example, a label, a stamp, or the like) on a material such as a roll sheet P in a large volume. However, the CPU 12 can instruct the printer 30 to perform large-volume printing that exceeds the range of the data size (for example, short type) exchanged between the application program 22 and the printer driver 24 via the operating system 20 by causing the printer driver 24 to execute the above-described process. Moreover, since it is possible to instruct the printer 30 to perform the large-volume printing only with the check in the large-volume setting portion 55, it is possible easily to switch whether to perform the large-volume printing or not. In addition, since it is possible to instruct the printer 30 to perform large-volume printing through the process by the printer driver 24, it is possible to instruct the printer 30 to perform large-volume printing regardless of the kind of the operating system 20 or the application program 22.

The reciprocal relation between the constituent components of the present embodiment and the constituent components of the invention will be clarified below. The process in Step S170 and S190 of the process routine when the property button is pressed as shown in FIG. 4 according to the present embodiment corresponds to the process in the step (a) of the invention, and each process of the print instruction transmitting routine as shown in FIG. 7 corresponds to the process in the step (b) of the invention. In addition, the user PC 10 of the present embodiment corresponds to the print instructing device of the invention, the RAM 14 to the storing unit, and the CPU 12 for causing the printer driver 24 to execute a process to the storage controlling unit and print instructing unit. The description on the operation of the user PC 10 in the present embodiment clarifies an example of the process executing method of the invention.

According to the user PC 10 of the embodiment described above, when the large-volume setting portion 55 is checked, the large-volume flag F is set to the value "1" and the large-volume flag F and the number of prints in the Devmode are written in the Private region 14*b*. At the same time, the data other than the number of prints in the Devmode are written in the Public region 14*a* and the Private region 14*b* in the same manner as when the large-volume setting portion 55 is not checked. In the case of giving a print instruction to the printer 30, the print instruction is given to the printer 30 by using the Devmode including the number of prints written in the Public region 14*a* when the large-volume flag F is the value "0". On the other hand, the print instruction is given to the printer 30 by using the Devmode including the number of prints written in the Private region 14*b* when the large-volume flag F is the value "1". Therefore, it is possible to instruct the printer 30 to perform large-volume printing that exceeds the range of the size of the data exchanged between the application program 22 and the printer driver 24 via the operating system 20.

The invention is not limited to the embodiment described above, and various modifications of the invention is possible as long as they belong to the technical scope of the invention.

In the embodiment described above, the property screen 50 includes the large-volume setting portion 55. However, the property screen may include a setting portion for setting whether a value relating to printing is a value that exceeds a predetermined value, may include a large size setting portion for setting whether to perform printing in a sheet size that exceeds a predetermined size set in advance (for example, the length of the roll sheet P in the longitudinal direction (the winding direction) is longer than a predetermined length), in addition to or instead of the large-volume setting portion 55, or may include a large number of pixels setting portion for setting whether to perform printing with the number of pixels that exceeds a predetermined number of pixels set in advance. Furthermore, in the case where the property screen 50 has the large-volume setting portion 55, the large size setting portion, and the large number of pixels setting portion, when the OK button 56 on the property screen 50 is pressed, the flag F2 the value of which is set to "1" when at least one of the large-volume setting portion 55, the large size setting portion, and the large number of pixels setting portion is checked and the value of which is set to "0" when all of the portions are not checked and the data (such as the number of prints, the sheet size, and the number of pixels) relating to the portions that are checked are stored in the Private region 14*b*, and the data relating to the portions that are not checked are stored in the Public region 14*a*. Then, in the case where a print instruction is given to the printer 30, when the flag F2 is the value "1", the value written not in the Public region 14*a* but in the Private region 14*b* may be used for the data relating to the portions that are checked.

In the above-described embodiment, when the large-volume setting portion 55 is checked, a user is informed that the maximum number of prints that is possible to be input into the number of prints setting portion 54 has become greater to be the second upper limit of the number of prints from the first upper limit of the number of prints by enlarging the region of the number of prints setting portion 54 in comparison with the time when the large-volume setting portion 55 is not checked. However, it may be possible to inform the user that the maximum number of prints that is possible to be input into the number of prints setting portion 54 has become greater with another method (for example, by a display or sound notification of the maximum number of prints that is possible to be input) than the above-mentioned method, or it may not be informed to the user.

In the above-described embodiment, it has been described that the state where the property screen 50 (see FIG. 5) on which the large-volume setting portion 55 is not checked is displayed on the display 18, in other words, the state where the large-volume setting portion 55 is not checked, when the property button 45 on the print setting screen 40 is pressed, is set to default values of the Devmode. However, when the state where the large-volume setting portion 55 is checked is set to the default values of the Devmode, and when the user selects printing of a document or an image during the execution of the application program 22 to display the print setting screen 40 on the display 18, the large number of prints (for example, 999 or 9999) set in advance in the number of prints setting portion 47 may be displayed.

In the above-described embodiment, in the case where a print instruction is given to the printer 30, the print instruction to the printer 30 is performed according to the value of the large-volume flag F. However, the print instruction to the printer 30 may be performed according to whether the print-related value which is a value relating to printing and exceeds a predetermined value (the number of prints in this embodiment) is stored in the Private region 14*b* or not, instead of the large-volume flag F.

In the above-described embodiment, when the OK button 56 is pressed in a state where the large-volume setting portion 55 is checked and then the property screen 50 is closed, the large number of prints (for example, 999 or 9999), which is set in advance in the number of prints setting portion 47 on the print setting screen 40, is displayed. Instead, the value "1" may be displayed, or that the large-volume setting portion 55 is checked may be displayed with another method.

The embodiment above has described the user PC 10 as a print instructing device. However, the embodiment may be about a process executing method of executing a process by a driver, and about a program for executing a process executing method.

What is claimed is:

1. A printing apparatus comprising:
a printing mechanism for printing onto a sheet;
storing unit having a first region capable of storing a first data and a second region capable of storing a second data;
a storage controlling unit causing a print-related value to be stored in the second region when an excess instruction that is an instruction for defining the print-related value as a value that exceeds a predetermined value is given; and
a print instructing unit giving a first print instruction to a printing mechanism by using print setting information including the first data when the print-related value is not stored in the second region, and giving a second print instruction to the printing mechanism by using print setting information including the second data when the print-related value is stored in the second region, in a case of giving a print instruction to the printing mechanism.

2. The printing apparatus according to claim 1, wherein the first region is defined by the operating system and recognizable by the operation system, an application program, and a printer driver; the second region is defined by the printer driver and recognizable only by the printer driver.

3. The printing apparatus according to claim 1, wherein the upper limit of the print-related value is stored in the second region when the print-related value is stored in the second region.

4. The printing apparatus according to claim 1, wherein the print-related value comprises a value including at least one of the number of copies, the size of a sheet, and the number of pixels.

5. The printing apparatus according to claim 1, wherein the predetermined value comprises an upper limit of the print-related value that a user is allowed to input when the excess instruction is not given, and the method further comprises:
informing a user that the user is allowed to input the print-related value that is equal to or less than a second predetermined value higher than the predetermined value when the excess instruction is given before the storing of the print-related value.

* * * * *